A. E. COWL.
Thill-Couplings.

No. 148,418. Patented March 10, 1874.

Witnesses.
A. Ruppert.
H. E. Quinn

Inventor.
A. E. Cowl
by P. Edw. J. Eils
his Atty

UNITED STATES PATENT OFFICE.

ALPHEUS E. COWL, OF PATTERSON, NEW YORK.

IMPROVEMENT IN THILL-COUPLINGS.

Specification forming part of Letters Patent No. 148,418, dated March 10, 1874; application filed February 12, 1874.

*To all whom it may concern:*

Be it known that I, ALPHEUS E. COWL, of Patterson, in the county of Putnam and State of New York, have invented a certain Improvement in Thill-Couplings, of which the following is a specification:

This invention relates to that class of thill-couplings in which a rubber cushion is interposed between the axle-clip and the knuckle or hook of the thill-iron, which, by constantly holding the latter in intimate contact with the pintle upon which it turns, prevents all rattling in the joint.

My improvement consists, first, in arming the rubber block or cushion with a metallic plate upon its exposed surfaces, the extremities of the bent plate jutting over the clip above and below for the purpose of holding the block in proper position, to further which end the rear portion of said rubber block is also beveled to a V, fitting a correspondingly-formed recess in the clip; secondly, in the employment, with the clip carrying such an armored rubber block, of a hooked thill-iron, provided with a pivoted latch, so arranged that, when it has been turned down over the gap of the hook, and the thill is turned up into the proper working position, it becomes locked between the hook and the rubber block, making the disengagement of the clip and hook impossible while the thill remains in the position mentioned.

Figure 1:
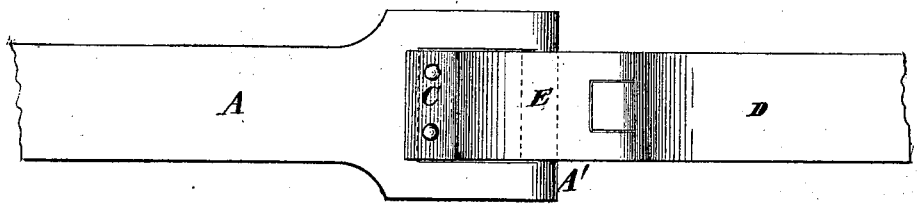
Figure 2:
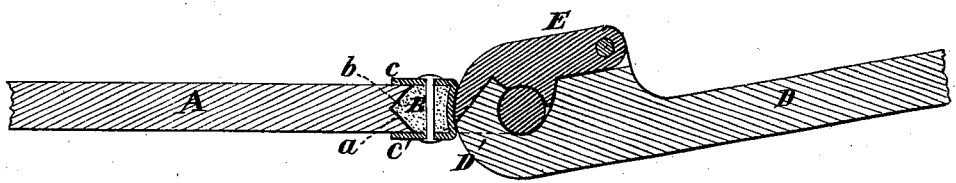
Figure 3:
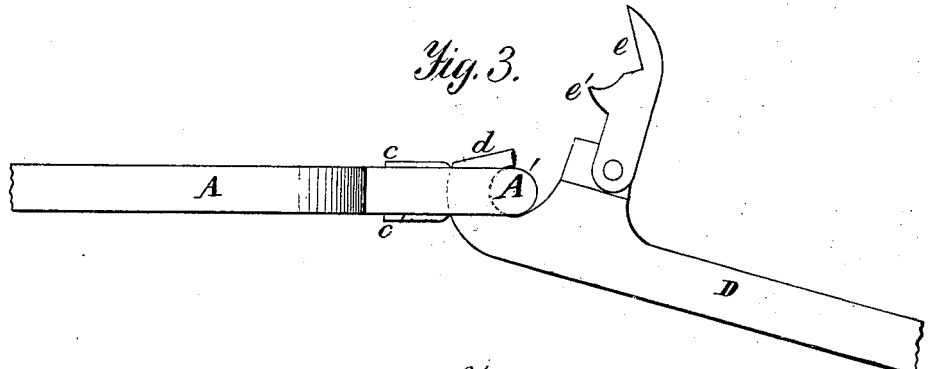
Figure 4:
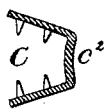

In the annexed drawing, Figure 1 is a plan view of my improved thill-coupling. Fig. 2 is a longitudinal section thereof, showing the thill-iron at about the inclination it assumes when the thills are turned up into the working position. Fig. 3 is a side elevation, showing the thill-iron turned down, and the latch thrown up, to permit the unlocking of the thill-iron from the clip. Fig. 4 shows a modification of the armor for the rubber block or cushion.

The same letters of reference are used in all the figures in the designation of identical parts.

The clip A terminates at its extremity in a loop, the end bar A' of which is cylindrical, and constitutes the pivot-bar or fixed pintle on which the thill-iron turns and draws. Within the loop of the clip is inserted the rubber block or cushion B, the V-shaped portion $b$ of which enters a similarly-formed recess, $a$, in the main body of the clip, as clearly shown in Fig. 2. The exposed sides of the rubber block are covered with a metallic plate, C, bent around it, for the double purpose of protecting it against frictional wear from the thill-iron, and of holding it more securely in position, to which latter end the extremities $c$ and $c^1$ project over the clip upon both its upper and under sides.

This armor may be made of plate-steel, and suitably riveted to the rubber block, or of malleable iron, as illustrated in Fig. 3, the legs diverging somewhat, being provided with spurs, which, in clamping the legs onto the rubber block, enter into the same, and prevent its accidental disengagement. At $c^2$, where the thill-iron bears against it, the armor should be made pretty heavy.

The thill-iron D is intended to hook from below onto the end bar A' of the clip, its extremity being, to this end, made in hook form, as shown at D'. For the purpose of locking the clip and thill-iron together, the latter is provided with a pivoted latch, E, upon its upper side, which terminates in a tongue, $e$, fitting, when the latch is turned down, onto the part $d$ of the hook, and forming a continuation of the curved portion thereof. A projection, $e'$, is also formed on the under side of the latch, to close down upon the end bar or pintle A', and to form a bearing at that point. When the thill is turned up into the proper working position, the finger or tongue $e$ becomes caught between the hook of the thill-iron and the rubber block, and thus, becoming itself locked, also prevents the disengagement of the thill-iron from the clip.

As usual, the rubber block is of such dimensions that it will be somewhat compressed when the parts of the coupling are properly united together.

I do not propose to claim, broadly, arming the rubber block with a metallic plate, nor the use of a self-locking latch; but in each case only the particular construction and arrangement of the co-operating parts.

What I claim as my invention, and desire to secure by Letters Patent, is—

1. The rubber block B, beveled at $b$, to fit a V-shaped recess in the clip A, and armed with a metallic plate, C, the extremities $c$ and $c^1$ of which jut over the clip above and below, substantially as and for the purposes specified.

2. The clip A A' and thill-iron D D', in combination with the metal-lined rubber block B C and latch E, provided with a tongue, $e$, and projection $e'$, respectively adapted to the hook D' and the pintle A', substantially as and for the purposes specified.

In testimony whereof I have signed my name to the foregoing specification in the presence of two subscribing witnesses.

ALPHEUS E. COWL.

Witnesses:
D. P. COWL,
B. EDW. J. EILS.